United States Patent [19]

Shaffer et al.

[11] 4,388,606

[45] Jun. 14, 1983

[54] SEQUENTIAL PHOTOFLASH ARRAY AND FABRICATION EMPLOYING RADIATION-ACTIVATED SWITCHES

[75] Inventors: John W. Shaffer; Boyd G. Brower, both of Williamsport, Pa.

[73] Assignee: GTE Products Corporation, Stamford, Conn.

[21] Appl. No.: 253,328

[22] Filed: Apr. 13, 1981

[51] Int. Cl.³ .......................................... H01L 31/08
[52] U.S. Cl. ..................................... 338/15; 431/359
[58] Field of Search .................. 338/15, 21; 431/359; 252/518; 362/13

[56] References Cited

U.S. PATENT DOCUMENTS

| | | | |
|---|---|---|---|
| 4,144,418 | 3/1979 | Girard et al. | 431/359 X |
| 4,281,363 | 7/1981 | Mecone et al. | 362/13 X |
| 4,286,307 | 8/1981 | Harvey et al. | 362/13 X |
| 4,320,440 | 3/1982 | Brower et al. | 431/359 X |
| 4,330,821 | 5/1982 | Brower et al. | 362/13 X |
| 4,336,570 | 6/1982 | Brower et al. | 362/11 X |

Primary Examiner—C. L. Albritton
Attorney, Agent, or Firm—Thomas H. Buffton

[57] ABSTRACT

A self-sequencing multilamp photoflash array responsive to a low voltage source includes radiation-responsive switches having a pair of electrical conductors spaced by a switch paste comprising a heat sensitive silver compound, a powdered metal in stoichiometric excess and an organic binder. The array has a flashlamp coupled to a pair of electrical conductors and a plurality of series connected flashlamps and radiant-responsive switches connected in parallel to the electrical conductors with each switch responsive to a previously energized flashlamp. Also, a process is provided for fabricating the switches and the array.

16 Claims, 5 Drawing Figures

SEQUENTIAL PHOTOFLASH ARRAY AND FABRICATION EMPLOYING RADIATION-ACTIVATED SWITCHES

TECHNICAL FIELD

This invention relates to sequential photoflash arrays and radiation-activated switches and more particularly to a sequential photoflash array, radiation-activated switches and a process for fabrication of such structures.

CROSS REFERENCE TO OTHER APPLICATIONS

This application includes information disclosed but not claimed in a concurrently-filed application bearing Ser. No. 253,329 and the same title, assigned to the Assignee of the present application and filed Apr. 13, 1981 in the names of Emery G. Audesse, William J. Harvey, Gary L. Houseknecht and John W. Shaffer.

BACKGROUND ART

Generally, self-sequencing multilamp photoflash arrays which operate from a high voltage source are not uncommon in the art. Such structures, the so-called Flip Flash of U.S. Pat. No. 3,894,226 for example, normally operate from a piezoelectric source controlled by the shutter action of a camera and provide high voltage pulses in the range of about 500 to 4000 volts. These relatively high voltage pulses are utilized in conjunction with radiant-activated switches to provide sequential activation of multilamp photoflash arrays.

One known high voltage arrangement is suggested in U.S. Pat. No. 4,182,608 issued Jan. 8, 1980. Therein, a high voltage source provides voltage pulses of a magnitude sufficient to convert a radiation switch from a high to a low resistance path. Also, the radiation switch includes a silver source, such as the suggested silver carbonate, and a metal containing material such as titanium metal and titanium hydride.

Although the above-mentioned high voltage self-sequencing structures have been and still are utilized in many popular photolamp arrays, there is a notable absence of self-sequencing structures utilizing a low voltage or battery-operated type voltage source. This conspicuous absence of low voltage self-sequencing multilamp arrays is believed to be a result of poor reliability of the self-sequencing array due to undesired variations in the resistance of the available radiant-responsive chemical-type switches available. It is believed that these undesired resistance variations which cause serious current limiting to a filament-type low voltage flashlamp have rendered flash reliability unacceptable in self-sequencing low voltage arrays.

More specifically, it is believed that the known and available radiant-activated switches leave much to be desired insofar as post-conversion electrical resistance capabilities, mechanical integrity, and adherence are concerned. Although post-conversion resistance values as high as 2-ohms or greater are of no great consequence in a high voltage self-sequencing array, such values are intolerable in a low voltage type structure. Also, excessive gas evolution, as a result of decomposition of gas-releasing species, is deleterious to the adherence capabilities of a radiation-responsive type switch. Moreover, increases in binder content in an effort to compensate for poor adherence due to gas evolution tends to undesirably increase the post-conversion resistance of the switch.

SUMMARY OF THE INVENTION

Thus, it is an object of the present invention to provide a self-sequencing multilamp array suitable for use with a low voltage source. Another object of the invention is to provide a process for fabricating such an array. A further object of the invention is to provide an enhanced radiant-responsive chemical-type switch suitable for use in the above-mentioned self-sequencing multilamp array. A still further object of the invention is to provide an enhanced process for fabricating the above-mentioned improved radiant-responsive chemical-type switch.

These and other objects, advantages and capabilities are achieved in one aspect of the invention by a self-sequencing multilamp photoflash array responsive to a low voltage source and having radiation-responsive switches each with a pair of electrical conductors spaced by chemical switch paste comprising a mixture of heat sensitive silver compound, a powdered metal and an organic binder with each of the switches positioned adjacent to and responsive to radiation from a nearby flashlamp to provide a low resistance path from a low voltage source to a succeeding flashlamp of the array.

In another aspect of the invention, a self-sequencing multilamp photoflash unit is fabricated by a process wherein a printed circuit board having a plurality of parallel circuits each coupled to a pair of electrical conductors is provided, a flashlamp is affixed to one of the parallel circuits with a series connected radiation-responsive switch connected to each one of the remaining parallel circuits and the radiation-responsive switch positioned adjacent a flashlamp energizable prior to the energization of the series connected flashlamp, and coupling the electrical conductors to the low voltage source providing discrete electrical pulses.

A further aspect of the invention includes a radiation-responsive switch suitable for use in a self-sequencing low voltage array wherein a pair of electrical conductors are spaced by a chemical switch paste having a heat sensitive silver compound, a powdered metal in stoichiometric excess and an organic binder with the switch convertible from a high to a low resistance to electrical current from a low voltage source coupled to the electrical conductors.

A still further aspect of the invention provides a radiation-responsive switch fabricating process wherein a pair of insulation-covered electrical conductors are selected; positioned adjacent one another; a portion of the insulation covering of the electrical conductors is removed; a chemical switch paste of the heat sensitive silver oxide, a powdered metal in stoichiometric excess and an organic binder is prepared; and the chemical switch paste is deposited intermediate that portion of the pair of electrical conductors wherefrom the insulation was removed.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
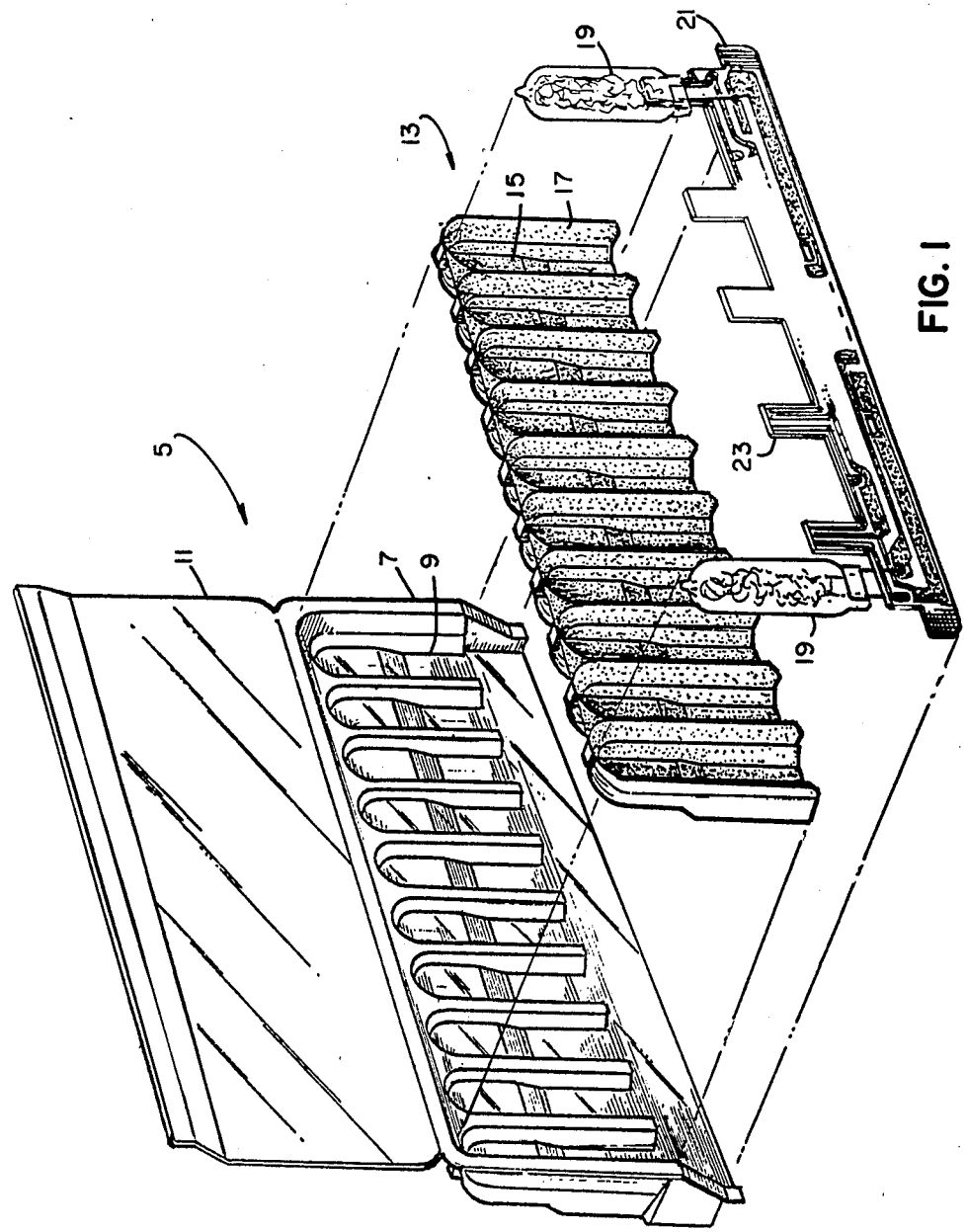
FIG. 1 is an exploded view of a self-sequencing multilamp photoflash array of the invention.

Referring to FIG. 1 of the drawings, a self-sequencing multilamp photoflash array has a plastic housing member 5 with a back portion 7 having a plurality of cavities 9 therein and a light transmittable front portion 11 formed to fold and enclose the cavities 9. A reflector unit 13 has a plurality of reflector cavities 15 each having a reflective surface 17 thereon and formed to nest within the cavities 9 of the back portion 7 of the housing member 5. Each of the reflector cavities 15 is also formed to receive a flashlamp 19 immediately adjacent the reflective surface 17.

Figure 2:
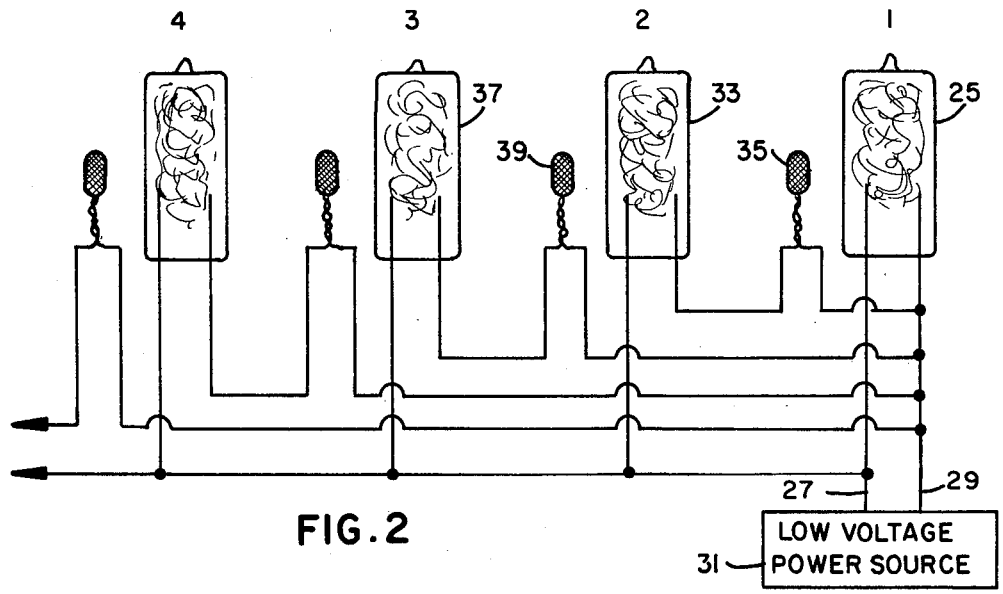
FIG. 2 is a diagrammatic illustration of the electrical coupling of the array of FIG. 1.

The flashlamps 19 are affixed to a printed circuit board 21 by soldering or other well known attachment techniques. The printed circuit board 21 includes a pair of electrical conductors, a plurality of parallel circuits and a plurality of radiation responsive switches 23 as will be explained hereinafter. As can more readily be seen in FIG. 2, a first flashlamp 25 is directly coupled to a pair of electrical conductors 27 and 29 connected to a low voltage power source 31 such as a 1.5-volt battery, for example. A second flashlamp 33 and a first radiation-responsive switch 35 are series connected and form one of the parallel circuits coupled to the pair of electrical conductors 27 and 29. Also, the first radiation-responsive switch 35 is contiguous with or closely adjacent the first flashlamp 25. Similarly, a third flashlamp 37 and second radiation-responsive switch 39 are series connected and parallel coupled to the pair of electrical conductors 27 and 29. Moreover, the second-radiation responsive switch 39 is positioned immediately adjacent to the second flashlamp 33. Thus, sequential firing of the array is effected.

As to the radiation-responsive switches, it has previously been mentioned that known switch paste compositions tend to exhibit undesired adherence and mechanical integrity problems. It is believed that such problems are associated with a number of conditions such as the employment of gas-releasing materials which evolve gases upon decomposition and organic binders which form gaseous products upon combustion. Also, increasing binder content in an effort to improve mechanical integrity undesirably increases post-conversion of the switch which is obviously deleterious to a low voltage system. Moreover, a switch paste having a relatively high evolution of gases tends to "burn-off" due to the vigor of the conversion when a closely positioned flashlamp is employed and such "burn-off" in turn results in undesired relatively high post-conversion resistance.

In overcoming the above-mentioned deficiencies, a radiation-responsive switch paste is provided utilizing a heat sensitive silver compound. Preferably, silver oxide is employed because of the relatively low gas evolution characteristics as compared with silver carbonate and other carbon-containing silver compounds for example which tend to blister and loosen the resultant porous switch paste.

Also, a metal powder in stoichiometric excess with respect to the reaction thereof with the silver compound is utilized. In this manner, silver content and switch paste costs are reduced. Preferably, metal powders in the range of about 5 to 70% are employed depending upon the relative location of the switch with respect to the flashlamp. More specifically, as the radiant energy seen by the switch decreases, the amount of metal powder is reduced toward the lower end of the given range. The preferred metal powders are aluminum and titanium which tend to limit the reaction temperature of the switch composition because of their high specific heats. Other powders which are useable but not preferred because of their relatively low specific heats and higher costs are zirconium and hefnium, for example.

A preferred organic binder is one with relatively low water absorption which tends to minimize gas generation (water vapor in this case). Polystyrene is preferred although other organic binders such as epoxy, acrylics, ployvinyl butyral, and polyvinyl formal are suitable substitutes. Moreover, the binder content may vary in the range of about 1 to 15% although about 3% is preferred.

Figures 3, 4, 5:
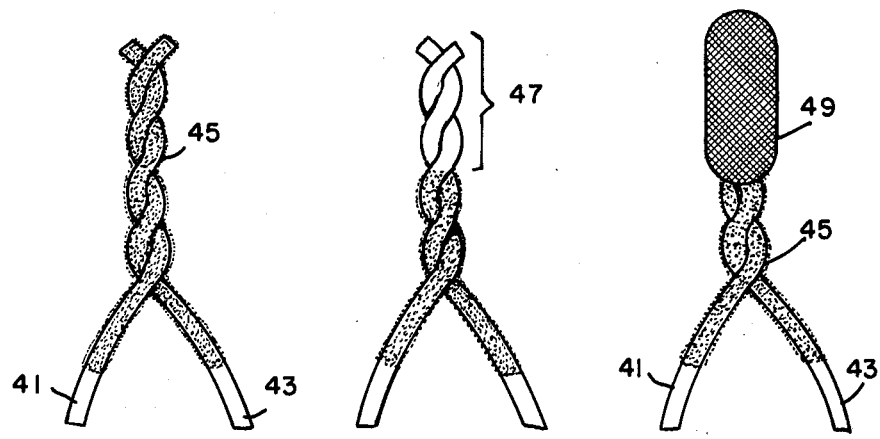
FIGS. 3 to 5 are illustrations of one form of radiation-responsive switch suitable to the array of FIG. 1.

As to the radiation-responsive switch, FIGS. 3-5 illustrate a preferred form of switch. Herein, a pair of electrical conductors 41 and 43 having an insulator covering 45 thereon are twisted about one another. The insulator covering 45 is removed from a portion 47 and this portion 47 is dipped into a switch paste 49. Thus, the switch paste 49 serves as an insulator material prior to activation and upon conversion provides a low resistance path between the electrical conductors 41 and 43. Alternative structures wherein the electrical conductors 41 and 43 are parallel or normal and crossing one another and separated by a switch paste 49 are also suitable for use in self-sequencing multilamp arrays.

As to fabrication of a radiation-responsive switch and a self-sequencing multilamp photoflash array, a switch paste was prepared from a dried composition comprising about 70.0% silver oxide, 27.3% aluminum powder and 2.7% polystyrene resin. A pair of insulator-covered wires was twisted together, a portion of the insulation removed and the portion of the wires wherefrom the insulation was removed was dipped into the above-described switch paste to provide the radiation-responsive switch.

Once having the radiation-responsive switch, a printed circuit board having a plurality of parallel circuits each connected to a pair of electrical conductors was provided. A flashlamp was connected to the pair of electrical conductors of the printed circuit board and a series connected flashlamp and a radiation-responsive switch was connected to each one of the parallel circuits. Also, the radiation-responsive switch of each of the series connected flashlamps and switches was positioned adjacent a previously energizable flashlamp. Thereafter, the pair of electrical conductors was connected to a low voltage source providing discrete electrical pulses.

In operation, an electrical pulse from the low voltage source activates the flashlamp connected to the electrical conductors. In turn, the activated flashlamp energizes a nearby radiation-responsive switch to convert the resistance thereof from a relatively high to a relatively low value. Thereafter, a pulse from the low voltage source is applied by way of the low resistance path of the previously-activated radiation-responsive switch to a second flashlamp which is, in turn, activated and provides energization of a second radiation-responsive switch. Thus, the self-sequencing array responds to a low voltage source such as available in numerous present day cameras.

As a specific example of the above-described array, five radiation-responsive switches were fabricated from 24-gauge enameled-copper wire by twisting two and one-half inch lengths together, removing the enamel from the last half-inch of the twisted wire's end and coating this last half-inch with a switch paste. The switch paste was the previously-mentioned dried composition comprising 70.0% silver oxide, 27.3% aluminum powder (<240 mesh) and 2.7% polystyrene binder.

Thereafter, the radiation-responsive switches and flashlamps were mounted on a printed circuit board, as previously described, and a pair of electrical conductors was connected to a low voltage source capable of providing discrete electrical pulses in the range of about 1.2 to 1.8 volts and in this instance, voltage pulses of about 1.5 volts. One and one-half volt pulses of about 35 milliseconds duration were utilized and in all cases the lamps were fired in sequence. In other words, each lamp fired as an additional pulse was provided and in no case did more than one lamp fire upon application of a pulse voltage. Moreover, it was found that the electrical resistance of the switches after functioning was in the range of about 0.04 to 0.10 ohms.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

Thus, there has been provided a unique self-sequencing multilamp photoflash array which includes radiant-responsive switches and is suitable for use with a low voltage supply. The self-sequencing array is especially suitable for use with low voltage cameras and includes radiant-responsive switches which have been an especially low post-conversion resistance. As a result of this relatively low post-conversion resistance the array is not only reliable and economical but the switches tend to be reliable, have good mechanical integrity and are especially resistant to undesired "burn-off" caused by excessive gas evolution.

Also, a process is provided for fabricating the radiant-responsive switches as well as the self-sequencing arrays. In accordance with the array fabricating process, a low voltage source is connectable to the array by a single pair of electrical conductors. Moreover, the switch fabricating process provides radiant-responsive switches of good mechanical integrity which are highly resistant to burn-off and provide a desired low resistance to electrical current passage from a low voltage source to a flashlamp.

We claim:

1. A radiation-activated switch for a self-sequencing multilamp photoflash array comprising a pair of electrical conductors spaced by a chemical switch paste and characterized by the improvement wherein said chemical switch paste includes a heat sensitive silver compound, a powdered metal in stoichiometric excess and selected from the group consisting of aluminum and titanium and an organic binder with said chemical switch paste responsive to radiation from a nearby photoflash lamp activated from a low voltage source to provide a low resistance to electrical current flow between said pair of electrical conductors.

2. The radiation-activated switch of claim 1 wherein said powdered metal in stoichiometric excess is aluminum.

3. The radiation-activated switch of claim 1 wherein said powdered metal in stoichiometric excess is titanium.

4. The radiation-activated switch of claim 1 wherein said organic binder is a polystyrene resin.

5. The radiation-activated switch of claim 1 wherein said chemical switch paste comprises a dried composition of about 70.0% silver oxide, 27.3% aluminum powdered metal and about 2.7% polystyrene resin.

6. The radiation-activated switch of claim 1 wherein said chemical switch paste provides a resistance to electrical current flow between said pairs of electrical conductors in the range of about 0.04 to 0.10 ohm in response to activation by said radiation from a nearby photoflash lamp.

7. The radiation-activated switch of claim 1 wherein said organic binder is a relatively low water absorption organic resin binder selected from the group consisting of epoxy, acrylics, polyvinyl butyral and polyvinyl formal.

8. The radiation-activated switch of claim 1 wherein said powdered metal is a quantity in the range of about 5 to 70% by weight.

9. The radiation-activated switch of claim 1 wherein said organic binder is of a quantity in the range of about 1 to 15%.

10. A process for fabricating a radiation-activated switch for a self-sequencing multilamp photoflash array comprising the steps of:
    selecting a pair of insulating-covered electrical conductors;
    positioning said insulating-covered electrical conductors adjacent one another;
    removing said insulation covering from a portion of said adjacent pair of electrical conductors;
    preparing a chemical switch paste which includes a heat sensitive silver compound, a powdered metal in stoichiometric excess selected from the group consisting of aluminum and titanium, and an organic binder;
    depositing said chemical switch paste intermediate said pair of electrical conductors at said portion wherefrom said enamel was removed to provide a radiation-activated switch.

11. The process of claim 10 wherein said positioning of said insulation-covered electrical conductors include the steps of twisting said electrical conductors about one another, removing insulation from a portion of said insulation-covered electrical conductors and dipping said portion of said electrical conductors wherefrom said insulation was removed into said chemical switch paste.

12. The process of claim 10 wherein said step of positioning said insulation-covered conductors includes the locating of said pair of conductors parallel to one another.

13. The process of claim 10 wherein said step of positioning said insulation-covered conductors includes the step of locating said pair of conductors normal and overlaying one another.

14. The process of claim 10 wherein said preparing a chemical switch paste includes a heat sensitive silver compound in the form of silver oxide.

15. The process of claim 10 wherein said step of preparing a chemical switch paste includes a powdered metal in the form of aluminum in stoichiometric excess.

16. The process of claim 10 wherein said step of preparing a chemical switch paste includes the selection of an organic resin binder selected from the group consisting of polystyrene, epoxy, acrylics, polyvinyl butyral and polyvinyl formal.

* * * * *